I. D. MEALS.
ANTISKIDDING DEVICE FOR TIRES.
APPLICATION FILED FEB. 29, 1912.
1,049,893.
Patented Jan. 7, 1913.
2 SHEETS—SHEET 1.
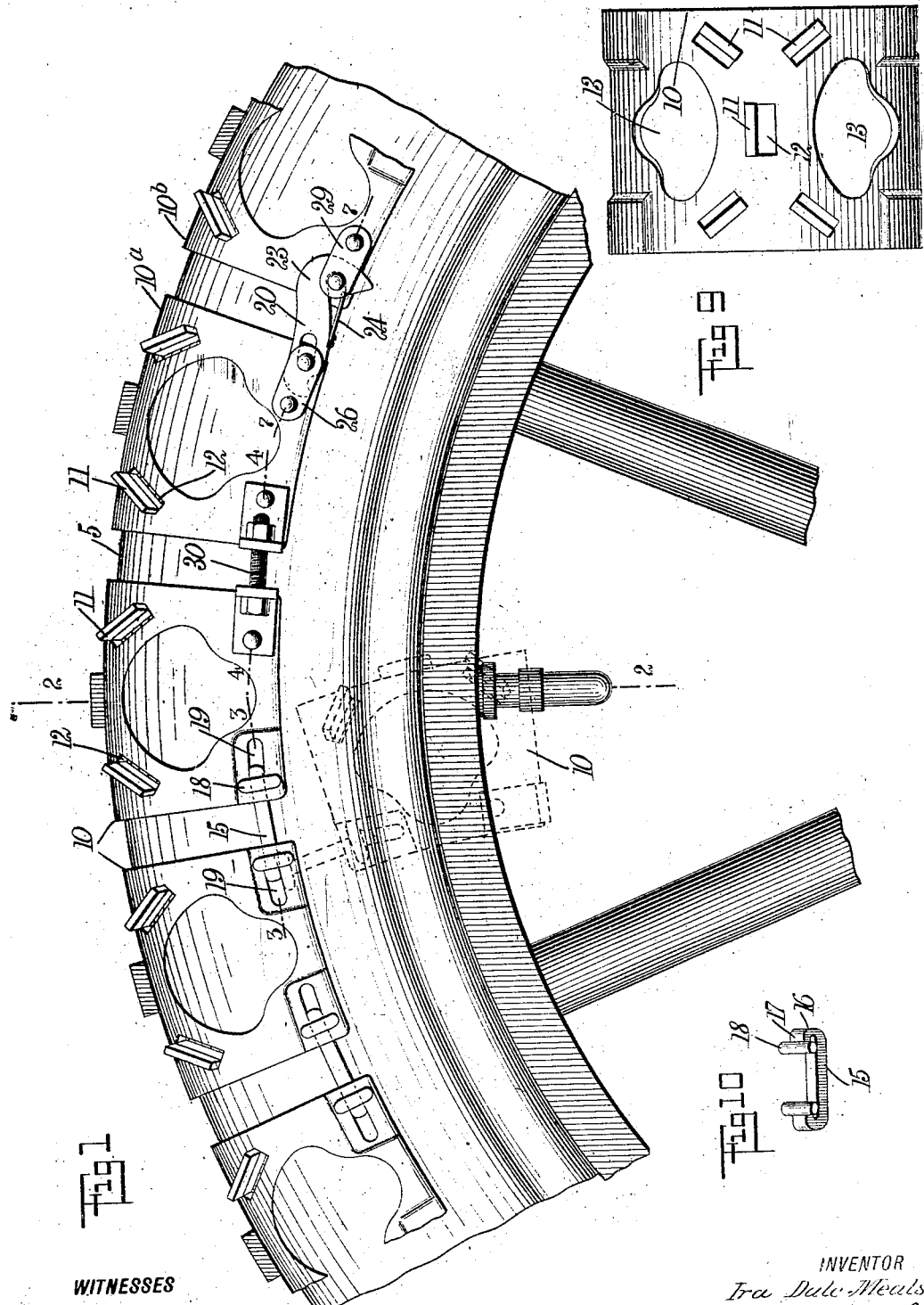
WITNESSES
C. J. Hachenberg
J. L. McAuliff
INVENTOR
Ira Dale Meals
BY Munn & Co
ATTORNEYS

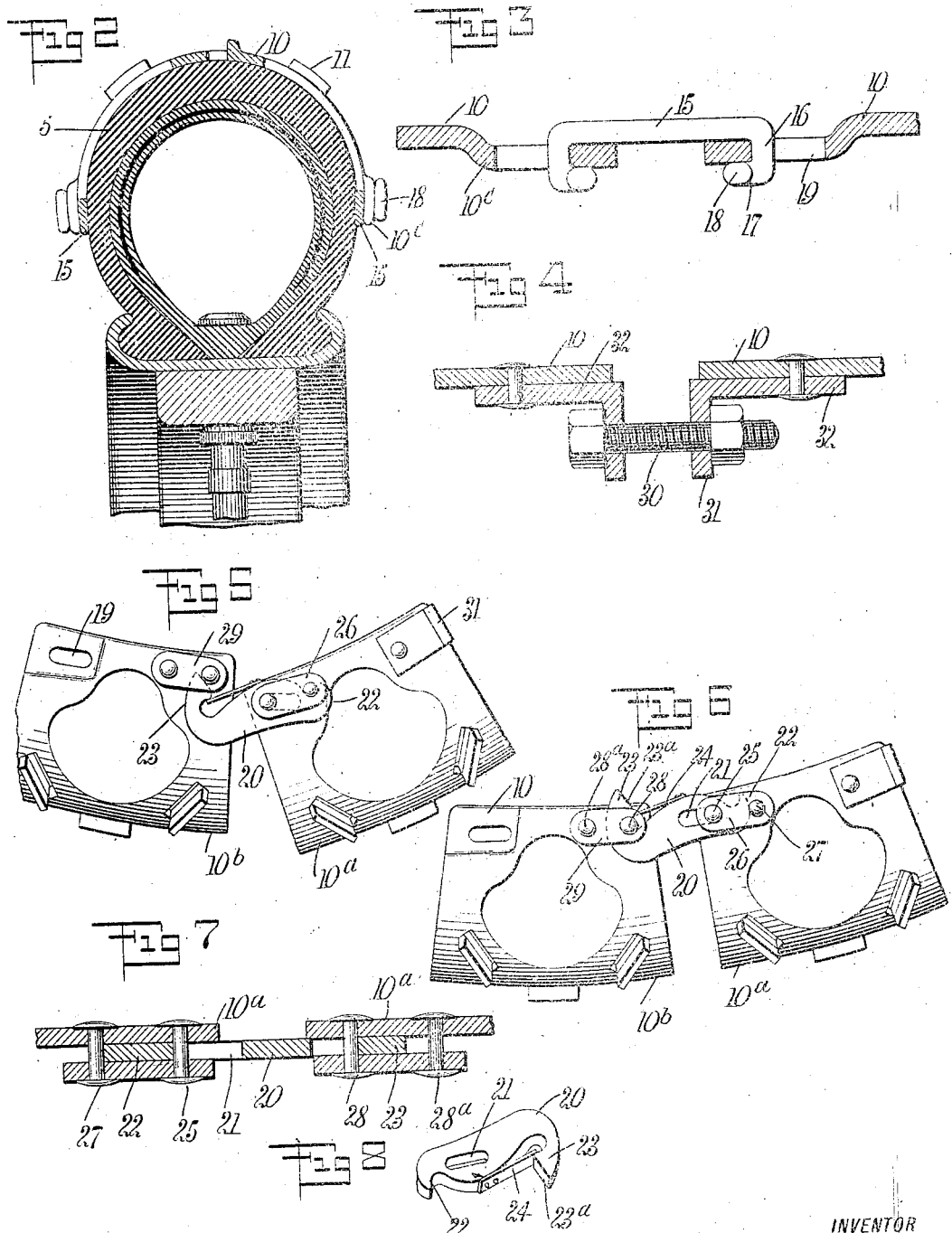

UNITED STATES PATENT OFFICE.

IRA DALE MEALS, OF HARRISBURG, PENNSYLVANIA.

ANTISKIDDING DEVICE FOR TIRES.

1,049,893.

Specification of Letters Patent.

Patented Jan. 7, 1913.

Application filed February 29, 1912. Serial No. 680,580.

*To all whom it may concern:*

Be it known that I, IRA DALE MEALS, a citizen of the United States, and a resident of Harrisburg, in the county of Dauphin and State of Pennsylvania, have invented a new and Improved Antiskidding Device for Tires, of which the following is a full, clear, and exact description.

The invention relates to devices attachable to the tread of a vehicle tire, for preventing skidding, and more particularly to that class of anti-skidding devices comprising separate semicircular sections coupled together to extend around the tire at the tread and sides.

An object of my invention is to provide an anti-skidding device consisting of a chain formed of sections of the general character referred to, and comprising novel connecting elements in devices of this character.

It is important in actual practice, that the sections forming the chain be permitted movements relatively to one another both radially and longitudinally without exerting any pull on one another when moving in response to the pressure exerted on the successive links when the weight of the car is imposed thereon. To permit the necessary relative movements of the sections as referred to, links have been employed on which the sections may pivot or tilt, the sections being movable by a slotted connection with the links in a longitudinal direction without straining each other. In connection with my improved anti-skidding chain the end sections are provided with means for automatically coupling the same. In practice, when applying the chain of anti-skidding sections to the tire, one end section of the chain is pressed into place over the tire, or two sections, and the car is started ahead, and the result of which is that the chain will wrap itself around the tire, each successive link taking its position behind the other as the wheel rolls over the chain. To successfully apply the chain in the described manner, I provide an automatic coupling link for uniting the end sections of the chain, the arrangement being such that as the last link moves onto the tire adjacent to the link first applied, the pressure exerted on the tire, due to the imposed weight, will cause the coupling link to automatically couple the two end sections. The described automatic operation of the coupling, however, exerts a pulling action which is provided for by employing the mentioned link and slot connections between others of the chain sections, so that the loose connection due to the link and slots will enable the end sections to respond to the latching action of the coupling link. The coupling link, in effecting the automatic latching engagement, has both a pivotal and sliding engagement with the respective end sections, and when the latching engagement is effected there is a slack at the coupling link, which must be taken up. In order to make provision for taking up the slack allowed in the coupling link during the latching engagement, and the slack given the remaining sections at the link and slot connection, and tighten the chain on the tire after coupled engagement, I employ any approved slack adjuster, and have illustrated a known expedient for this purpose; my invention therefore, as regards the slack adjuster or tightening device does not reside in its special construction, but in the relation of such device to the coupling link and other links in the chain, and the combination of these elements with the chain sections.

The invention further consists in the novel features of the special automatic coupling link and its appurtances, in the special form of the link uniting the other sections in the chain, and in the special form of the individual chain sections, all of which will be more fully pointed out hereinafter in connection with the specific description of the illustrated embodiment of my invention.

Reference is to be had to the accompanying drawings forming a part of this specification, in which similar characters of reference indicate corresponding parts in all the views.

Figure 1 is a side elevation of a portion of an anti-skidding chain formed in accordance with my invention, the same being shown as applied; Fig. 2 is a cross section approximately on the line 2—2 of Fig. 1; Fig. 3 is a cross section approximately on the line 3—3 of Fig. 1; Fig. 4 is a cross section approximately on the line 4—4 of Fig. 1; Fig. 5 is a side elevation of the two end sections of the chain, and the automatic coupling link therefor, showing the said elements in the position they occupy when the latch is about to couple; Fig. 6 is a side view of the elements shown in Fig. 5, with the automatic coupler in the latched position; Fig. 7 is a transverse section through the automatic coupler and adjacent parts of the end links of the chain, the section being taken on about the line 7—7 in Fig. 1; Fig. 8 is a perspective view of the automatic coupling link for the end sections; Fig. 9 is a plan view of one of the sections of the chain; and Fig. 10 is a perspective view of the form of link employed in connecting various of the chain sections.

The chain is made up of similar sections indicated by the numeral 10, the end sections being indicated by $10^a$ and $10^b$. For the major portion of the chain the sections are united by links 15, the end sections being coupled by a link 20, there being disposed at one or more points around the wheel a tightener, which may consist of a bolt or screw 30. Each link 15 comprises an elongated body, the ends of which extend laterally, as at 16, and then have a return-bend toward each other, as at 17, for a short distance, the members 17 being formed with T-heads 18 spaced from the elongated body approximately the thickness of the metal in the sections 10. The members 16 of the links 15 move in slots 19 in the sections 10, the slots being formed in portions $10^c$ which are offset from the body of the sections a distance approximately equal to the thickness of the elongated body of the link 15, so as to permit the said body portion of the link to move between the offset portions of the sections 10 and the sides of the tire 5. In assembling the sections in chain form, the sections must be brought approximately at right angles to each other, as indicated by dotted lines Fig. 1, to bring a head 18 of a link 15 parallel with a slot 19, and permit the head to pass through a slot. When the sections are brought into line with each other, it will be seen that the T-heads 18 are transverse to the slots 19 and disposed approximately radially on the wheel, so there can be no accidental disengagement. The described slot-and-link connection also results in permitting the sections to tilt relatively to one another and to move radially as the tire yields to the weight of the car at the bottom of the wheel, so that the shifting of one section results in no longitudinal pull on the adjacent sections. When a sufficient number of sections have been connected to suit the size of the tire, one of the end sections is provided with a special coupling link 20, and the opposed end section has a co-acting member for said coupling link. The link has a diagonal slot 21 intermediate between its ends and desirably nearer to one end than the other, and at the end adjacent to said slot, the link 20 is formed into a hook 22, while the opposite end of the link has a larger hook consisting of a bill 23 and a spring tongue 24 arranged after the manner of a snap hook.

A rivet 25 or its equivalent passes through the slot 21 of the link, through a side of one end section $10^a$ near the corner thereof, and through a keeper plate 26, the link being thus loosely held between the outer surface of the section $10^a$ and the keeper 26, so that the link may have sliding and pivotal movement. The opposite end of the keeper 26 is united to the section $10^a$ by a second rivet or post 27 in such a manner as to space the keeper from the section. The opposite end of the link 20, which is formed with the snap hook 23, 24, is adapted to have latching engagement with a stud or rivet 28 on the adjacent end section $10^b$, said stud or rivet and a similar stud or rivet $28^a$ serving to secure on the end section $10^b$, a keeper plate 29, between which and the said end section the bill 23 of the snap hook moves.

In applying a chain having the link 20 and its appurtenances to a tire, the link 20 is first placed in position with its small bill 22 hooked over the stud 27, as indicated in Fig. 5. One of the end sections is now pressed into place on the tire, the chain being stretched along the floor or ground. When the car is now started ahead, each successive link will be pressed onto the tire and will have frictional engagement therewith so that the chain will wrap itself around the tire, each successive link taking its position until the mating end link is pressed into place, at which time the link 20 will be automatically snapped into coupling engagement, the bill 23 being forced beneath the keeper 29, and the beveled surface $23^a$ of said bill will engage the stud 28, and said stud will be snapped beneath the spring tongue 24. Then at the next revolution of the wheel, when the weight of the car is brought to bear on section $10^b$, the link is rocked sufficiently to disengage the hook 22, and the link 20 will be drawn longitudinally to the position as shown in Fig. 6.

The latching engagement of the link 20 is effected automatically, the necessary movements being the result of the movements of the sections $10^a$, $10^b$ when said sections arrive at the bottom of the wheel and the tire yields under the weight of the car. When the end sections have been coupled, all slack in the chain of sections is taken up by the bolt or screw 30, or any equivalent take-up device, said bolt or screw engages the outwardly projecting members 31 on angle irons 32 secured respectively to the adjacent ends of any two links.

Each of the sections 10, $10^a$ and $10^b$, has an improved arrangement of anti-skidding members to engage the surface of the roadway, said members consisting of integral ears 11, which are struck up from the body of the section at approximately right angles to the outer surface of said section, thereby producing at the base of each ear 11 an opening 12 extending through the section to the under side, said openings permitting the escape of grit from beneath the tread surface of the chain section. The ears 11 are preferably so located as to dispose the same in a manner to effectively engage the roadway; thus each link has a longitudinal central ear, and pairs of diagonally disposed ears at each side of the central ear, as best seen in Fig. 9. To enable the grit, pebbles or the like that may enter beneath the section at the sides to find escape, each section is provided at each side with a large opening 13.

Having thus described my invention, I claim as new, and desire to secure by Letters Patent,—

1. An anti-skidding device, consisting of a chain comprising a series of separate sections approximating the cross section of the tread and side portions of the tire; links forming a loose connection between the side portions of said chain sections and permitting movement of the said sections relatively to one another both radially and longitudinally; an automatic coupling link carried at one end by one end section of the chain and having pivotal and sliding movements on said end section, said coupling link having a latch formation at its inner edge at its opposite end and being movable to engage and disengage the opposed end section by a longitudinal sliding and swinging movement; and a take-up device interposed between sections of the chain to take up the slack permitted between the sections for the operation of the automatic coupling link.

2. An anti-skidding device for tires, consisting of a series of sections adapted to seat on a tire, the sections having movement relatively to each other longitudinally and pivotally to enable the chain to wrap itself on a tire as the wheel is run over a chain, and a coupling link for the end sections, the said coupling link being pivoted on one end section and slidable thereon and co-acting with a keeper on the other end section, said link having a latching head movable into automatic latching engagement with the keeper to couple the said end sections when pressure is exerted on the tire by the weight of the car.

3. In a tire attachment for application to the exterior of the tire, a pair of sections, means for uniting said sections comprising a link mounted on one section and having a latching member to detachably engage the other of said sections, and means for temporarily holding said link in position to latch by a relative movement of the sections.

4. An anti-skidding device for tires, consisting of a chain of separate connected sections, and means for automatically coupling the end sections of the chain, said means comprising a link pivotal and slidable on one end section, a device for holding said link from the mentioned pivotal and slidable movement and a device on the other section with which the link has pivotal latching engagement.

5. An anti-skidding device for tires, consisting of a chain of connected sections, keepers on the end sections, studs associated with said keepers, and a link having a hook engageable with one of the studs associated with one of the said keepers, and a slot through which the other stud of said keeper passes, said link having a snap hook at the other end having latching engagement with the stud on the other end section of the chain.

6. In an attachment for application to the exterior of the tire, a pair of sections, means for uniting said sections comprising a link mounted on one section for movement toward and from the other of said sections and having a latching member for engaging said other section, means for temporarily holding said link in position for latching movement, and a device for engaging the link and releasing it from said temporary holding means when the sections are brought into juxtaposition.

7. In an anti-skidding device for tires, a pair of sections, means for uniting said sections comprising a link having a hook at one end detachably engaging one of said sections, said link having slidable and pivotal movement on the other end section, and means for temporarily holding said link from such slidable and pivotal movement.

In testimony whereof I have signed my name to this specification in the presence of two subscribing witnesses.

IRA DALE MEALS.

Witnesses:
J. H. SNYDER,
HENRY C. PIERCE.